Aug. 22, 1933.   F. W. BURGER   1,923,811
WHEEL FOR MOTOR VEHICLES
Filed June 11, 1927   2 Sheets-Sheet 1

Inventor
Frederick W. Burger,
By John L. Jackson.
Attorney

Witness
Milton Lenoir

Aug. 22, 1933.     F. W. BURGER     1,923,811
WHEEL FOR MOTOR VEHICLES
Filed June 11, 1927     2 Sheets-Sheet 2
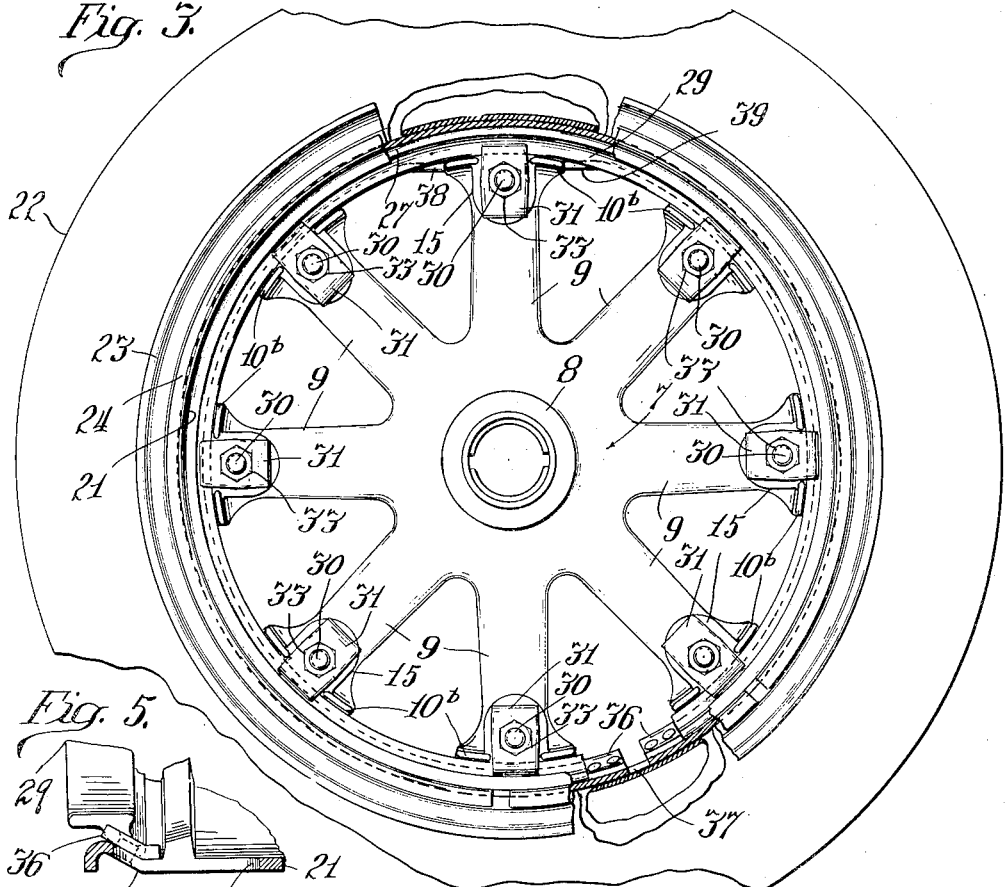
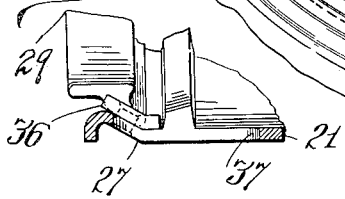
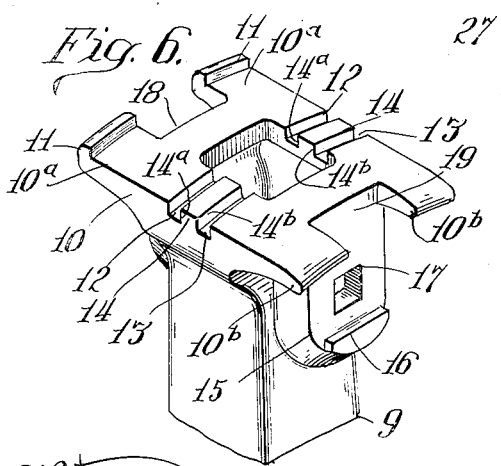
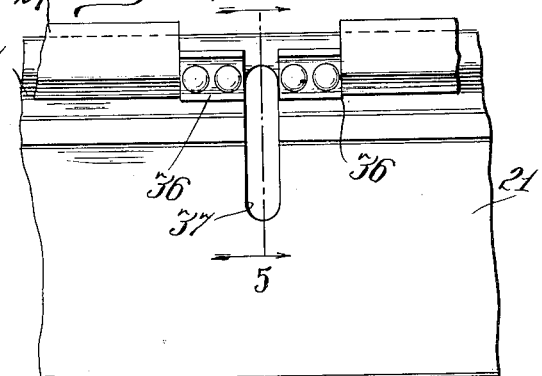

Patented Aug. 22, 1933

1,923,811

UNITED STATES PATENT OFFICE 1,923,811

WHEEL FOR MOTOR VEHICLES

Frederick W. Burger, Niles, Mich., assignor to Clark Equipment Company, Buchanan, Mich., a Corporation of Michigan Application June 11, 1927. Serial No. 198,035

11 Claims. (Cl. 301—12)

My invention relates to dual wheels such as are commonly used as the rear wheels of motor trucks. Such wheels are frequently equipped with pneumatic tires, and my present invention has to do with dual wheels of that sort, and particularly with metal wheels in which the tire-carrying rims are removably mounted on a cast metal spider or wheel body comprising a hub and hollow spokes radiating therefrom. It has for its object to provide an improved construction by which the rims may be easily applied to or removed from the spider or wheel body, and by which the two rims will be held securely thereupon with an equal amount of pressure, and will be properly spaced apart and centered on the spider or wheel body. I accomplish this object as illustrated in the drawings and as hereinafter described. What I regard as new is set forth in the claims.

In the accompanying drawings

Figure 3 is a side elevation, some parts being shown in section.

Figure 4 is an under side view of a portion of one of the rims showing the driving lugs.

Figure 5 is a partial cross section of the lower portion of the rim on line 5—5 Figure 4; and Figure 6 is a perspective view of the outer end of one of the spokes.

Figure 1:
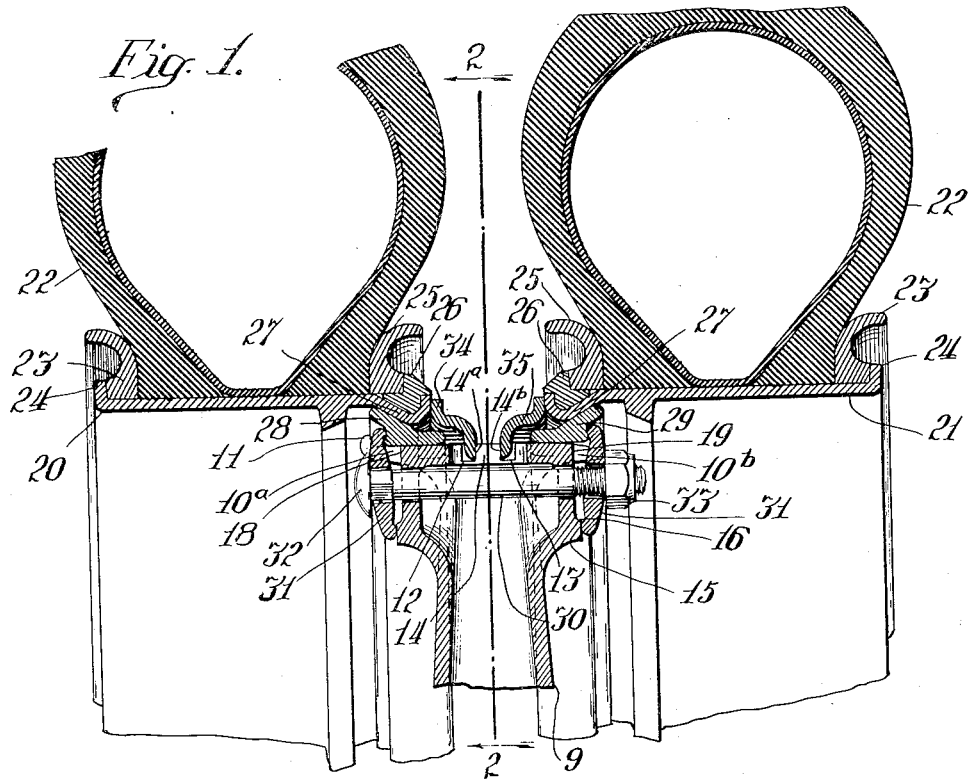
Figure 1 is a partial vertical cross section of my improved wheel taken through the outer end of one of the spokes.

Referring to the drawings, in which I have shown my invention embodied in a wheel of the spoke type, 7 indicates the wheel body as a whole, 8 indicates the hub, and 9 the spokes. This spider is usually cast as a unit, the spokes being hollow and preferably approximately rectangular in cross section. At their outer ends they are provided with pads or seats 10 transversely disposed with reference to the plane of the wheel, on the outer surfaces of which seats wedge rings hereinafter described are adapted to fit. These seats project beyond the opposite side faces of the spokes and under the inner margins of the wheel rims, as shown at 10a and 10b in Figure 6, and their outer faces are made slightly arcuate to conform to the curvature of the wheel rims. At one end each seat is provided with upwardly extending lugs 11, shown in Figure 6, to prevent the wedge ring mounted on that end of the seat from slipping off. Each seat is also provided with a pair of parallel transverse grooves 12, 13 separated by an intermediate rib 14, these ribs being located centrally or approximately midway between the end margins of the seat, and lying in a vertical plane which intersects the axis of the wheel at right angles. These ribs provide shoulders or abutment means 14a, 14b, against which the spacing rings hereinafter described bear.

The outer ends of the spokes are also provided with radially disposed bosses 15 that underlie the opposite end portions of the seats 10 and are furnished with laterally projecting shoulders 16 near their lower ends. Above the shoulders 16 each of the spokes is provided with alined transverse perforations 17 which extend through the bosses 15 and the opposite walls of the spoke, for the purpose of receiving a clamping bolt, as will be hereinafter described. Above the bosses 15 the seat 10 is cut away to provide notches 18 and 19 for the reception of clamps by means of which the wedge rings are forced into place and secured.

As illustrated in Figure 1, two wheel rims 20, 21 are mounted on the wheel body at opposite sides thereof. These rims are alike but they are oppositely arranged on the wheel body. Each of said rims is adapted to carry a suitable tire, such as a pneumatic tire 22, and is provided with suitable means for holding the tire in place, which in the illustrated arrangement comprises an outer ring 23 that fits on the outer surface of the rim and abuts against an annular marginal flange 24. The opposite or inner side of the tire is held in place by an inner ring 25 which also fits on the rim and is held in place by a split locking ring 26 seated in the grooved inner margin 27 of the rim. The wheel rims illustrated are a type well known commercially, and so far as my invention is concerned it should be understood that any other suitable type of rim having an inner margin so formed that the rim may be secured on the spider by wedging action may be employed. As shown in Figure 1, the grooved portion 27 of the rim is bent inward, or toward the axis of the wheel, so that an annular inclined surface is provided that is adapted to be engaged by a wedge ring, for securing the rim in position on the spider.

Figure 2:
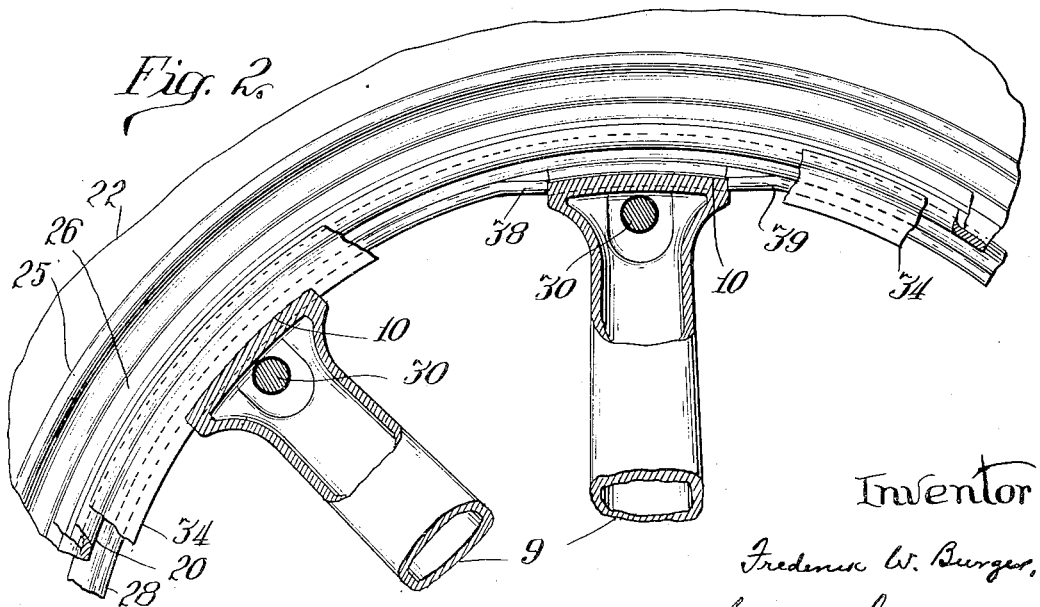
Figure 2 is a partial sectional view on line 2—2 Figure 1.

The internal diameter of the inner margins of the rims is somewhat greater than the diameter of the spider, so that the rims may be slipped over the spider in mounting or demounting them. For securing the rims in place I provide two transversely split wedge rings 28, 29 that are adapted to fit upon the wheel body between the outer surfaces of the seats 10 and the inclined inner margins of the wheel rims, the dimensions of the parts being such that by forcing said wedge rings toward each other the wheel rims will be tightly wedged in place on the wheel body and at opposite sides thereof. As shown in Figure 2, the outer surfaces of the wedge rings 28, 29 are inclined, and their under surfaces are approximately horizontal, their inclined surfaces bearing against the inclined surfaces at the inner margins of the rims, and their horizontal surfaces bearing on the outer surfaces of the seats 10. Said wedge rings are forced toward each other to secure the desired wedging action by means of bolts 30 that extend through the outer ends of the spokes, being fitted in the transverse perforations 17. Mounted on the opposite end portions of these bolts are clamp plates 31, the lower margins of which bear against the shoulders 16, while their upper marginal portions extend through the notches 18, 19 and engage the outer faces of the wedge rings 28, 29. Preferably such outer faces are recessed to better receive said clamp plates. The heads of the bolts are shown at 32 in Figure 1, and 33 indicates the nuts by means of which the clamp plates are forced together.

It is apparent that by drawing the clamp plates 31 together the wedge rings 28, 29 will be forced toward each other from opposite sides of the spokes, and therefore if the wheel rims be held against movement toward each other said wedge rings may be drawn up as tightly as necessary to properly secure the rims on the spider. For limiting the extent to which the rims may approach each other in this tightening operation I provide spacing rings 34, 35, the inner margins of which are fitted in the grooves 12, 13 respectively, and abut against the shoulders 14a, 14b, while their outer margins diverge and bear against the inner margins of the wheel rims, as clearly shown in Figure 1. These spacing rings are also split transversely so that they may be conveniently applied to the wheel body or removed therefrom. When the spacing rings are in place between the two wheel rims they serve as stops or abutments to limit the extent to which the rims may approach each other, and thereby permit the wedge rings to be drawn up as tightly as may be desired. The spacing rings do not, however, interfere with the mounting or demounting of the rims because they may be easily removed from the wheel body to leave the way open for the application of the inner rim to the wheel body or its removal therefrom. It will be understood that in the illustration of Figure 1 the right hand rim is the outer rim of the wheel, that is, the rim next to the end of the axle. This outer rim is removed first and applied last. When the outer rim is off the wheel the spacing rings 34, 35 are readily accessible so that they may be removed to permit the removal of the inner rim. In mounting the rims these spacing rings are, of course, applied after the inner rim has been slipped over the wheel body into engagement with the inner wedge ring 28, which, as has been explained, is prevented from slipping off the wheel body by lugs 11. The spacing rings above described automatically position the rims properly when the wedges are drawn up because the inner spacing ring 34 forms a stop which positively limits the outward movement of the inner rim, and in like manner the outer spacing ring 35 forms a stop which positively limits the inward movement of the outer rim. As the ribs 14 are centrally located, the abutment of the spacing rings against the shoulders 14a, 14b insures the positioning of the wheel rims at points equidistant from the transverse center line of the wheel body. By the construction described both rims will be fastened with an equal amount of pressure since the force generated by the tightening of the nuts on the bolts is equalized and applied to both rims uniformly.

The driving strains are transmitted from the wheel body to the wheel rims through the wedge rings 28, 29. To this end the rims 20, 21 are provided at some convenient point with lugs 36 that are secured to the inner surfaces of the inclined inner margins thereof, to form abutments against which the separated ends of the wedge rings bear. As best shown in Figures 3 and 4, preferably two of these lugs are provided spaced apart at opposite sides of a transverse slot 37, through which the valve stem of the pneumatic tire extends. By this means the driving force applied to the wheel body is transmitted by the wedge rings to the lugs 36, and through them to the wheel rims. To prevent creeping of the wedge rings relatively to the wheel body, as best shown in Figure 2, said rings are provided at some convenient point with inwardly directed tangs 38, 39 spaced apart far enough to receive the outer end of a spoke between them, the ends of said tangs bearing against opposite sides of the spoke. Consequently the wedging rings are held against circular movement with respect to the wheel body.

By my improved construction the two rims of the dual wheels may be applied to the wheel body and removed therefrom at the same side of the wheel, and when mounted thereon are secured by equal pressure, are held properly spaced apart, and are properly positioned with respect to the central longitudinal, vertical plane of the wheel. While I have shown my invention as embodied in a wheel comprising a spider or wheel body of the spoke type, my improvements may also be embodied in wheels of the disc type, and therefore it should be understood that the term "spider" or "wheel body" as used in the claims is intended to comprehend both types of wheels except in such claims as the spokes are specifically referred to. Furthermore the claims herein made are not intended to be limited to the specific construction shown and described, except in so far as such construction is specifically claimed, since my invention includes generically the subject matter of the broader claims.

What I claim as my invention and desire to secure by Letters Patent is:

1. In a vehicle wheel, a wheel body comprising a wheel hub and spokes, means at the ends of the spokes forming peripheral grooves having surfaces disposed in planes normal to the axis of the wheel, spacing rings adapted to be loosely seated in said grooves and adapted to have lateral movement in said grooves, tire carrying rims having adjacent radially inwardly extending margins adapted to bear against said rings, wedge rings adapted to be forced between said margins and said seats, and clamping means adapted to draw said wedge rings together thereby causing said margins to bear against said rings and said rings against said shoulders whereby said rims are aligned equi-distantly from the central plane of said wheel body.

2. In a vehicle wheel, the combination with a spider comprising a wheel hub and spokes having peripheral seats, of spacing means on said seats disposed centrally thereof, tire carrying rims having radially inwardly extending margins adapted to bear on opposite sides of said spacing means and having abutment means thereon, split wedge rings adapted to be disposed between said margins and said seats and adapted to have their ends engage said abutment means to form a driving connection between said wedge rings and said rims, means on said wedge rings adapted to engage one of said spokes to form a driving connection between said wedge rings and spider, and means for securing said wedge rings in position.

3. In a vehicle wheel, the combination with a spider comprising a wheel hub and spokes having peripheral seats, of spacing means on said seats disposed centrally thereof, tire carrying rims having radially inwardly extending margins adapted to bear on opposite sides of said spacing means and having abutment means thereon, split wedge rings adapted to be disposed between said margins and said seats and adapted to have their ends engage said abutment means to form driving connection between said wedge rings and said rims, inwardly directed tangs on said wedge rings adapted to engage one of said spokes to form a driving connection between said wedge rings and spider, and means for securing said wedge rings in position.

4. In a vehicle wheel, the combination with a wheel body comprising a wheel hub and spokes having a peripheral seats, of abutment means on said seats, a tire carrying rim having a radially inwardly extending margin adapted to engage said abutment means, abutments on said margin, a split wedge ring adapted to be seated between said seats and said margin with its ends in engagement with the rim abutments to form a driving connection between said wedge ring and said rim, means on said wedge ring adapted to engage one of said spokes to form a driving connection between said wedge ring and wheel body, and means for securing said wedge ring in position.

5. In a vehicle wheel, the combination with a spider comprising a wheel hub and spokes having peripheral seats, of peripheral grooves in said seats forming opposed centrally disposed peripheral shoulders, spacing rings adapted to be loosely seated in said grooves and adapted to have lateral movement in said grooves, tire carrying rims having radially inwardly extending margins adapted to bear against said rings, abutment means on said margins, split wedge rings adapted to be mounted on said seats in abutment with said margins and adapted to have their ends engage said abutment means to form a driving connection between said wedge rings and said rims, means on said wedge rings adapted to engage one of said spokes to form a driving connection between said wedge rings and spider, and clamping means carried on said spokes adjacent said seats and adapted to draw said wedge rings together thereby causing said margins to bear against said rings and said rings against said shoulders whereby said rims are aligned equi-distantly from the central plane of said spider.

6. A dual wheel comprising a felloe-less wheel body having spokes and peripheral seat means provided with a central rib at the ends thereof and adapted to receive and support a pair of tire carrying rims in side-by-side relation, spacing means received by said seat means for spacing said rims apart comprising a pair of split rings adapted to seat one on each side of said rib, both rings being removable from one side of said seat means when extended to clear the rib, and clamping means comprising wedging rings carried by the spoke ends and disposed near the adjacent marginal edges of said rims and acting against the rims from both sides of the wheel body for drawing the rims against said spacing rings and said spacing rings against the central rib on the wheel body, said wedging rings also being split so as to be removable from one side of the wheel body when extended to clear the spoke ends.

7. A dual wheel comprising a wheel body having peripheral seat means provided with a fixed integral rib positioned in the central plane of the wheel body and adapted to receive and support a pair of tire carrying rims in side-by-side relation, said rims being provided with driving lugs, spacing means received by said seat means for spacing said rims apart comprising a pair of rings each having a radially inner portion and a radially outer portion, one of said rings being adapted to seat on each side of the central rib with its inner portions thereagainst, the radially outer portions of said rings abutting against the adjacent inner margins of said tire carrying rims and the laterally inner spacing ring being split so that when expanded it clears the rib and can thereby be removed with the other spacing ring from the laterally outer side of the wheel body to permit removal of both tire rims from the laterally outer side of the wheel, and clamping means comprising wedge rings acting against the rims from both sides of the wheel body for forcing the rims against the spacing rings and the spacing rings against the central rib and lugs adapted to be clamped against said wedge rings, said wedge rings having means providing positive driving engagement with said driving lugs and tangs providing positive driving engagement with said wheel body.

8. In a vehicle wheel, a wheel body comprising a wheel hub and spokes, means at the ends of the spokes provided with peripheral grooves having surfaces disposed in planes normal to the axis of the wheel, spacing rings of irregular cross section and thereby strengthened against radial stresses, said rings being adapted to be seated in said grooves against said surfaces, tire carrying rims having adjacent margins adapted to bear against said spacing rings, and clamping means adapted to draw said rims together against said spacing rings and said rings against said shoulders whereby said rims are aligned equi-distantly from the central plane of the wheel body.

9. In a dual rimmed wheel the combination with a wheel body having a hub and spokes radiating therefrom, said spokes having transverse seats at their radially outer ends, each of said seats having a shoulder, a flange at its laterally inner margin and notches at its opposite ends, said wheel body being adapted to support separate tire carrying rims mounted on the peripheral portion thereof with the adjacent margins of said rims extending over said seats and being inclined inwardly with respect to each other, of spacing rings mounted on the wheel body between said rims, the adjacent margins of said rings being adapted to bear against the shoulders on said seats and their outer margins being adapted to bear against the adjacent margins of said rims, wedge rings interposed between said seats and the adjacent margins of said rims, said flange acting as a stop for the laterally inner wedge ring, bolts extending transversely through the radially outer end portions of the spokes, and clamp plates mounted on the end portions of said bolts, the radially outer portions of said clamp plates extending through said notches into engagement with said wedge rings, whereby the clamp plates at opposite sides of the wheel body may be drawn together by means of said bolts to clamp the wheel rims against said spacing rings and secure the rings and rims on the wheel body.

10. In a dual rimmed wheel, the combination with a wheel body having a hub and spokes radiating therefrom, said spokes having transverse seats at their radially outer ends, each of said seats having means forming shoulders, a flange at its laterally inner margin and notches at its opposite ends, said wheel body being adapted to support separate tire carrying rims mounted on the peripheral portion thereof with the adjacent margins of said rims extending over said seats and being inwardly inclined with respect to each other, of spacing rings mounted on the wheel body between said rims, the adjacent margins of said rings being adapted to bear against the shoulders on said seats and their outer margins being adapted to bear against the adjacent margins of said rims, wedge rings interposed between said seats and the adjacent margins of said rims, said flange acting as means for limiting the laterally inward movement of the laterally inner wedge ring, means securing the rims and wedge rings on the wheel body comprising bolts extending transversely through the outer end portions of the spokes and clamp plates mounted on the end portions of said bolts, the radially outer portions of said clamp plates extending through said notches into engagement with said wedge rings, whereby the clamp plates at opposite sides of the wheel body may be drawn together by means of said bolts to clamp the wheel rims against said spacing rings and secure the rings and rims on the wheel body, said wedge rings having means providing for interlocking driving engagement with the wheel body and with the wheel rims independently of said securing means.

11. A dual rimmed wheel comprising a wheel body arranged to support separate tire carrying rims mounted on the peripheral portion thereof, means for spacing said rims apart including spacing rings both removable from the same side of the wheel body and abutment means disposed radially inwardly with respect to the peripheral surface of said wheel body, said abutment means acting to position the spacing rings in planes at right angles to the axis of the wheel body, and wedge rings at opposite sides of the wheel body shiftable laterally along the peripheral portion thereof and bearing against the adjacent margins of said rims for securing the latter on the wheel body.

FREDERICK W. BURGER.